Figure 1:
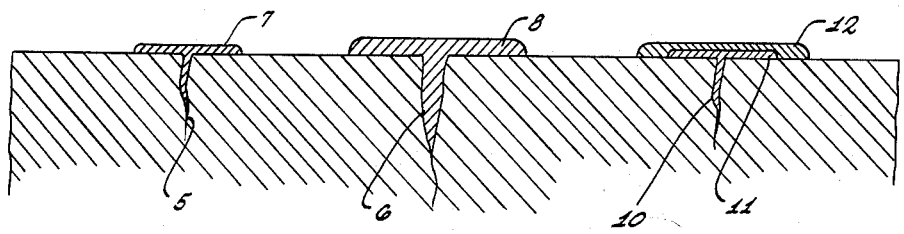

May 18, 1965  J. R. ALBURGER  3,184,596

FLAW DETECTION METHOD USING A LIQUID SOLVENT DEVELOPER

Filed Oct. 10, 1961

SENSITIVITY INDEX - $I_s$ OR CONCENTRATION

INVENTOR.
JAMES R. ALBURGER
BY
ATTORNEY 8,184,596
FLAW DETECTION METHOD USING A LIQUID
SOLVENT DEVELOPER
James R. Alburger, 5007 Hillard Ave.,
La Canada, Calif.
Filed Oct. 10, 1961, Ser. No. 147,391
8 Claims. (Cl. 250—71)

This invention relates to a method of and system for detecting certain types of particularly small flaws, such as shrink cracks, stress cracks, intercrystalline cracks, or corrosion microleaks, cold solder joints, etc., with penetrant tracers not normally visible under either normal lighting or under ultraviolet light.

In my copending application, Serial No. 82,374, filed January 13, 1961, now abandoned, a method of and system for detecting and measuring the sensitivity values of different fluorescent penetrant inspection tracers are disclosed and claimed, the system also measuring the absolute sensitivity ratings of such tracers. The measurement of sensitivity is made by measuring the spot diameter at the color threshold of the tracer.

It has been found that where a fluorescent or visible color dye is used in a liquid or resinous material as a tracer indicator, there is a characteristic dimensional sensivity whereby, at a certain critical film thickness, there exists a threshold below which the fluorescence or color substantially disappears. There is always a range of film thicknesses over which there occurs a transition from non-fluorescence to fluorescence, or no-color to color. Sensitivity ratings for given tracer materials in terms of Sensitivity Index ($I_s$) values, define the dimensional thresholds at which fluorescence or color disappears.

Many important applications of visible color or fluorescent tracers involve film thicknesses which may be close to or even below the threshold condition where fluorescence or color disappears. In extremely minute surface discontinuities, such as mentioned above, the film of tracer material may be on the order of $10^{-5}$ cm. or less, and at such dimensional magnitudes it is often impossible to detect any color or fluorescence in the tracer. This invention contemplates the development of fluorescent or visible color indications to a point of practical "seeability" or detectability even when the tracer film or entrapment is dimensionally smaller than that corresponding to its limit of sensitivity.

The invention also contemplates the improvement in performance of fluorescent sensitizers and tracers well beyond any previously attainable level. In this manner, it has become possible to extend the sensitivity of a tracer material even farther into the ultra-small; that is, flaws having dimensions on the order of a few millimicrons or less.

The principal object of the invention, therefore, is to facilitate the detection of extremely small flaws.

Another object of the invention is to provide an improved method of and system for treating materials in the inspection for microscopic or sub-microscopic surface flaws.

A further object of the invention is to provide a developing method and a developer to increase the fluorescence or visibility of tracers.

A better understanding of this invention may be had from the following detailed description when read in conjunction with the accompanying drawings, in which:

FIG. 1 indicates a series of flaws illustrating the invention; and

Figure 2:
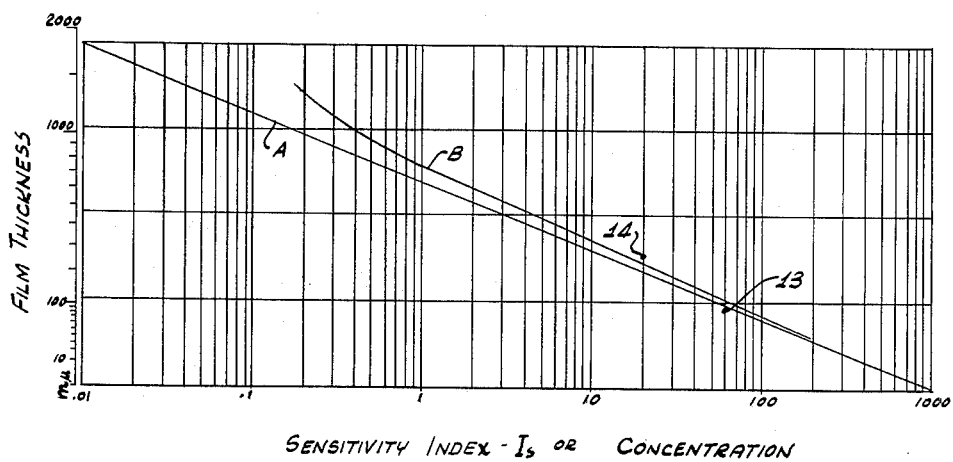

FIG. 2 is a graph illustrating the operation of the invention.

In my copending application, Serial No. 68,267, now Patent No. 3,107,298, filed November 9, 1960, it is disclosed that the threshold of fluorescent incidence for a given dye follows approximately a rectilinear line drawn on single logarithmic graph paper when the dimensional threshold is plotted against dye concentration. It is also disclosed that this applies to both fluorescent and visible color dyes. Such a graph is shown in FIG. 2. The graph of FIG. 2 along with the reference rectilinear line, and the scales of spot diameter, film thickness and concentration, have become standard in industry. The shapes of the sensitivity curves A and B shown in FIG. 2 indicate that an increase in film thickness with the corresponding decrease in concentration yields an increase in fluorescence or color response. This means that if the thin film of tracer material has a dimension such that its fluorescence or color response is just below the threshold of visibility, the addition of a suitable solvent or resinous material to increase the film thickness will increase the color or the fluorescent response to rise above the threshold of visibility. Also, a tracer film which is faintly visible can be rendered more distinctly visible merely by increasing its effective film thickness even though the concentration of the dye is decreased in the process.

To illustrate the action of my developer process and method, I may have a certain tracer material corresponding to the No. 7 Sensitizer, which has a characteristic shown by curve B and which has a concentration value of 60 on the chart of FIG. 2. Assume that a minute entrapment of this tracer has a film thickness of 100 millimicrons, which is below the critical threshold of fluorescent response, and hence no fluorescence can be seen. The operating point of the tracer is indicated by 13 on the chart. If I now apply a liquid developer to this tracer entrapment so that its film thickness is increased by a factor of 3 and its concentration simultaneously reduced by a factor of 3, then the operating point on the tracer film is moved to the left and up to point 14 on the chart. This new operating point is now above the threshold of fluorescent response so that a clearly visible fluorescent indication can be seen, where none could be seen prior to the application of the developer.

Conventional developers consist essentially of a slurry of fine powdered particles. For extremely small flaws, however, these powder-type developers are not satisfactory because the powder particles obscure the minute flaw indications or interfere with an examination of the shape of the flaw. The developer described hereinafter does not have these disadvantages and is a solvent which is compatible with the particular dye or senstizer material employed in the original tracer. My solvent has a relatively high viscosity and low solvency so that dye tracers reach out into the applied solvent film over a period of time. To increase its viscosity, a thickening agent is used, such as a resinous material soluble in the solvent. With this developer, the solvent and resinous thickener is compatible with the tracer dye and sensitizer so that as the dye bleeds into the developer film, it retains its color or fluorescence.

Referring again to the drawings, and particularly to FIG. 1, it is noted that the flaw 5 is of small dimensions compared with the flaw 6. The flaw 5 will exude a small film 7 over a period of time, while the flaw 6 will exude the film 8 over the flaw. Flaw 5 may be of such size that it is not visible or will not give a visible indication under black light. However, a small flaw 10, comparable in size to the flaw 5, has its exuded film 11 but is covered with a developer 12 which causes it to become visible in accordance with the chart in FIG. 2 for the reason described above. The particular developers and dyes and penetrant tracers used will now be given by way of examples.

*Example 1*

In the detection of minute porosities or fracture cracks in unglazed ceramic parts, the parts are immersed in a red, oily penetrant which will employ a solvent system which is insoluble in water. The ceramic parts are allowed to dwell in the dye penetrant for ten minutes, after which they are drained and immersed in an emulsifier for a period of one minute. The parts are then washed thoroughly in water to remove all traces of surface penetrant. At this point, minute entrapments in porous pits and cracks may be invisible because their dimensions are less than the threshold of visibility. The parts are now immersed in a water solution of methyl cellulose of about one percent concentration and allowed to drain and dry. This applies an extremely thin film of methyl cellulose to the surface of the parts, thus providing a barrier to slow down the rate at which the entrapped dyes can diffuse. After the parts are dried, they are sprayed with a thin coating of an acrylic plastic resin which is in a ketone solvent. Within a few seconds or minutes, while the resin film is drying, traces of dye are drawn out of the entrapments and form distinctly visible red indications. In this example, a short oil alkyd resin, dissolved in an alcohol solvent, may be substituted for the acrylic plastic developer.

*Example 2*

In the detection of any crystalline corrosion separations having dimensions on the order of $10^{-6}$ cm. or less, the parts to be inspected are thoroughly cleaned and are allowed to dwell for from ten to fifteen minutes in an ultra-sensitive fluorescent penetrant. The parts are then drained, emulsified for about one and one-half minutes, and washed thoroughly. At this point, the tracer entrapments smaller than 42 millimicrons are invisible. The parts are then dipped in a semi-viscous mixture of water, methyl cellulose thickener, and ethoxy nonyl phenol and are allowed to dry. In the wet condition, the water inhibits the tendency of the water-insoluble tracer to exude from the entrapments. As the parts dry, ethoxy nonyl phenol begins to act on the tracer, drawing the dye out into itself to form a relatively thick film which yields a visible fluoroescence under black light inspection. In this example, low volatility glycol ether or water soluble surfactants, such as polyethylene sorbitan monolaurate may be substituted for the ethoxy nonyl phenol.

*Example 3*

In the process for inspecting solder connections on an electronic printed circuit board, a fluorescent tracer is incorporated in a resin type flux which is used in the soldering. The sensitivity index of the solder flux may be as high as is practical to make it, such as 100 or more. After soldering is complete, the board assembly is washed thoroughly in isopropyl alcohol so as to remove any solder flux which remains on the surface and the board is dried. At this point, minute flux entrapments, which may be smaller than $10^{-5}$ in thickness, will be below the threshold of visibility. The circuit board is then sprayed with a thin film of fast drying resin solution. In the few seconds required for the film and resin to dry, traces of solder flux will be drawn from any defective solder joints and will show as a bright fluorescent ring around the solder drop.

*Example 4*

In testing for leaks in a water pipe or valve system, a water soluble tracer dye combination is incorporated in a volume of water inside the object, the sensitizer and color former providing an adequate level of sensitivity. On the outside of the valve, tank, or pipeline, a developer is applied consisting of a viscous solution of water and a thickener, such as methyl cellulose. As minute traces of tracer liquid leak through small openings, porosities or leakage paths, they diffuse into the film of viscous developer and become readily visible due to the augmentation of effective tracer film thickness.

I claim:
1. The method of detecting surface flaws in a part comprising the steps of,
   (a) immersing said part in a dyed, oily water-insoluble penetrant;
   (b) draining said part and immersing in an emulsifier;
   (c) washing said part in water to remove all surface traces of said penetrant;
   (d) immersing said part in a water solution containing a water-soluble thickener;
   (e) draining and drying said part; and
   (f) spraying said part with a thin coating of acrylic plastic resin, said resin simultaneously increasing the thickness of exuded films from said flaws and diluting said dye in said resin.
2. The method of detecting surface flaws in a part comprising the steps of,
   (a) immersing said part in an ultra-sensitive fluorescent penetrant;
   (b) draining and emulsifying said part;
   (c) washing said part thoroughly; and
   (d) immersing said part in polyethylene sorbitan monolaurate and then drying, to bring the operating point of the dye in said fluorescent penetrant from below the threshold of visibility to an operating point above the threshold of visibility.
3. The method of detecting surface flaws in solder connections comprising the steps of,
   (a) incorporating a fluorescent tracer in a resin-type soldering flux;
   (b) washing said solder connections in a solvent adapted to dissolve said soldering flux;
   (c) drying said solder connections; and
   (d) spraying said solder connections with a thin film of fast-drying plastic resin solution, to bring the operating point of the dye in said fluorescent penetrant from below the threshold of visibility to an operating point above the threshold of visibility.
4. In the non-destructive testing for flaws in surface, the step of applying over said surface which contains in said flaws entrapments of dyed flaw-penetrating material, a liquid solvent developer adapted to dissolve said dyed flaw-penetrating material to simultaneously increase the thickness of any exuded film from said flaws and dilute the dye concentration thereof to bring the operating point of the dye in said penetrating material from below the threshold of visibility to an operating point above the threshold of visibility.
5. In the nondestructive testing for surface flaws, the step of applying over said surface thereof which contains in said flaws entrapments of dyed flaw-penetrating material, a liquid developer adapted to simultaneously increase the thickness of any exuded film from said flaws and dilute the dye concentration thereof to bring the operating point of the dye in said penetrating material from below the threshold of visibility to an operating point above the threshold of visibility, said liquid developer being a plastic resin adapted to dissolve the dye in said penetrating material.
6. The method of detecting surface flaws in a part comprising the steps of,
   (a) Immersing said part in a dyed oily water-insoluble penetrant;
   (b) Draining said part and immersing in an emulsifier;
   (c) Washing said part in water to remove all surface traces of said penetrant;
   (d) Draining and drying said part; and
   (e) Spraying said part with a thin coating of plastic resin.
7. An inspection method for detecting a surface flaw in a part comprising the steps of applying a flaw-penetrating material containing at least one dye to the surface of said part, cleaning said part leaving a thin film of said material exuded from said flaw, and applying to the surface of said part a liquid solvent developer adapted to dis- solve said dyed flaw-penetrating material to simultaneously increase the effective thickness of said film of tracer indication and decrease the concentration of said dye in said film to bring the operating point of said penetrating material from below the threshold of visibility to an operating point above the threshold of visibility.

8. The method of detecting surface flaws in a part comprising the steps of, (a) immersing said part in an ultra-sensitive fluorescent penetrant;
(b) draining and emulsifying said part;
(c) washing said part thoroughly; and
(d) immersing said part in a semi-viscous mixture of water, water-soluble thickener and ethoxy nonyl phenol and then drying, to bring the operating point of the dye in said fluorescent penetrant from below the threshold of visibility to an operating point above the threshold of visibility.

References Cited by the Examiner

UNITED STATES PATENTS

| | | | |
|---|---|---|---|
| 2,478,951 | 8/49 | Stokely et al. | 252—408 |
| 2,663,692 | 12/53 | Corso et al. | 252—408 |
| 2,667,070 | 1/54 | Sockman et al. | 73—104 |
| 2,676,487 | 4/54 | Clarke et al. | 73—104 |
| 2,806,959 | 9/57 | De Forest | 250—71 |
| 2,953,530 | 9/60 | Switzer | 250—71 |
| 3,027,754 | 4/62 | Alquist | 73—40.7 |
| 3,028,338 | 4/62 | Parker | 250—71 |
| 3,117,227 | 1/64 | Pollack | 250—71 |

RALPH G. NILSON, *Primary Examiner.*

JULIUS GREENWALD, JAMES W. LAWRENCE, *Examiners.*